US007698340B2

(12) United States Patent
Ye et al.

(10) Patent No.: US 7,698,340 B2
(45) Date of Patent: Apr. 13, 2010

(54) PARSING HIERARCHICAL LISTS AND OUTLINES

(75) Inventors: Ming Ye, Bellevue, WA (US); Paul Viola, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 10/981,474

(22) Filed: Nov. 5, 2004

(65) Prior Publication Data

US 2006/0085466 A1 Apr. 20, 2006

Related U.S. Application Data

(63) Continuation of application No. 10/968,813, filed on Oct. 20, 2004.

(51) Int. Cl.
*G06F 7/00* (2006.01)

(52) U.S. Cl. .............. 707/755; 707/999.4; 707/999.101

(58) Field of Classification Search ................ 715/530; 707/3, 101, 4
See application file for complete search history.

(56) References Cited

U.S. PATENT DOCUMENTS 6,157,936 A * 12/2000 Mutschler et al. ........... 715/513
6,202,060 B1 * 3/2001 Tran ............................. 707/3
6,400,996 B1 * 6/2002 Hoffberg et al. .............. 700/83
6,565,611 B1 * 5/2003 Wilcox et al. ............... 715/541
6,651,218 B1 * 11/2003 Adler et al. ................. 715/530
6,970,882 B2 * 11/2005 Yao et al. .................... 707/102
2002/0078091 A1 * 6/2002 Vu et al. ..................... 707/513
2003/0215138 A1 11/2003 Raghupathy et al. ........ 382/186
2003/0215139 A1 11/2003 Shilman et al. ............ 382/186
2003/0215145 A1 11/2003 Shilman et al. ............ 382/195
2006/0242180 A1 * 10/2006 Graf et al. ................... 707/101

OTHER PUBLICATIONS

Michael Collins, "Discriminative Training Mehtods for Hidden Markov Modesl: Theory and Experiments with Perceptron Algorithms", Jul. 2002, AT&T Labs—Reasearch, pp. 1-8.*
Yasemin Altun et al., "Discriminative Learning for Label Sequences via Boosting", Department of Computer Science.
Ron Baecker, "A Principled Design for Scalable Internet Visual Communications with Rich Media, Interactivity, and Structured Archives", Knowledge Media Design Institute and Computer Science Department, pp. 1-14.
Michael Collins, "Discriminative Training Methods for Hidden Markov Models: Theory and Experiments with Perceptron Algorithms", AT&T Labs—Research, pp. 1-8.
James Allan et al., "Challenges in Information Retrieval and Language Modeling", Report of a Workshop held at the Center for Intelligent Information Retrieval, University of Massachusetts Amherst, pp. 31-47, Sep. 2002.

(Continued)

*Primary Examiner*—John E Breene
*Assistant Examiner*—Joshua Bullock
(74) *Attorney, Agent, or Firm*—Birch, Stewart, Kolasch & Birch, LLP

(57) ABSTRACT

A system and method for determining hierarchical information is described. Aspects include using the Collins model for parsing non-textual information into hierarchical content. The system and process assign labels to lines that indicate how the lines relate to one another.

37 Claims, 14 Drawing Sheets

OTHER PUBLICATIONS

J. Ruthruff et al., "End-User Software Visualizations for Fault Localization", ACM Symposium on Software Visualization, pp. 123-132, 2003.
Hanna M. Wallach, "Conditional Random Fields: An Introduction", University of Pennsylvania CIS Technical Report, pp. 1-9, Feb. 24, 2004.
Gonzalo Navarro, "A Guided Tour to Approximate String Matching", ACM Computing Surveys, vol. 33, No. 1, pp. 31-88, Mar. 2001.
Anil K. Jain et al., "Structure in On-line Documents", Department of Comp. Sci. and Engg. Michigan State University, pp. 1-5.
John Lafferty et al., "Conditional Random Fields: Probabilistic Models for Segmenting and Labeling Sequence Data", School of Computer Science, Carnegie Mellon University, Pittsburgh, PA.
Jisheng Liang et al., "An Optimization Methodology for Document Structure Extraction on Latin Character Documents", IEEE Transactions on Pattern Analysis and Machine Intelligence, vol. 23, No. 7, pp. 719-734, Jul. 2001.
Thomas P. Moran et al., "Pen-Based Interaction Techniques For Organizing Material on an Electronic Whiteboard", Xerox Palo Alto Research Center, pp. 1-10.
Lawrence R. Rabiner, "A Tutorial on Hidden Markov Models and Selected Applications in Speech Recognition", Proceedings of the IEEE, vol. 77, No. 2, pp. 257-286, Feb. 1989.
Bill N. Schilit et al., "Beyond Paper: Supporting Active Reading with Free Form Digital Ink Annotations", pp. 249-256, CHI 98, Apr. 1998.
Michael Shilman et al., "Discerning Structure from Freeform Handwritten Notes", Proceedings of the Seventh International Conference on Document Analysis and Recognition, 2003.
Ben Taskar et al., "Max-Margin Markov Networks", Stanford University.
Angi Voss et al., Concept Indexing, pp. 1-10, ACM 1999.
David Pinto et al., "Table Extraction Using Conditional Random Fields", ACM 2003.
John Munson, "System Study of a Dial-Up Text Reading Service for the Blind", pp. 228-239.
Eike Mittendorf et al., "Applying Probabilistic Term Weighting to OCR Text in the Case of a Large Alphabetic Library Catalogue", pp. 328-335, SIGIR 95.
George N. Sazaklis et al., "Geometric Decision Trees for Optical Character Recognition", pp. 394-396, 1997.
Steve Whittaker et al., "SCAN: Designing and evaluating user interfaces to support retrieval from speech archives", pp. 26-34, 1999 ACM.
Kazue Yoshida et al., "Development of an Optical Character Film Reader", Review of the Electrical Communication Laboratories, vol. 23, Nos. 11-12, Nov.-Dec. 1975.
Christos Faloutsos et al., "*FastMap*: A Fast Algorithm for Indexing, Data-Mining and Visualization of Traditional and Multimedia Datasets", pp. 163-174, 1995 ACM.
Matteo Golfarelli et al., "A Methodological Framework for Data Warehouse Design", pp. 3-9, ACM 1999.
Xuming He et al., "Multiscale Conditional Random Fields for Image Labeling", Department of Computer Science, University of Toronto, pp. 1-8.
Michael Shilman et al., "Statistical Visual Language Models for Ink Parsing", Department of Computer Science, University of California at Berkeley, 2000.
Internet Prinout: http://www.cs.brown.edu/research/ai/dynamics/tutorial/documents/H... Hidden Markov Models, dated Sep. 23, 2004.
Parsing UI during note-taking brochure.
John A. Harigan, "The K-Means Algorithm" -Clustering Algorithms, pp. 84-107, 1937.

* cited by examiner

1 — 1) Lorem ipsum dolor sit amet — 501
1c — consectetuer adipiscing elit — 502
1c — sed diam nonummy nibh euismod — 503

1 — 2) tincidunt ut laoreet dolore — 504
1c — magna aliquam erat volutpat — 505
1c — Ut wisi enim ad minim veniam — 506
1c — quis nostrud exerci tation — 507
1c — ullamcorper suscipit lobortis — 508

2 — —nisl ut aliquip ex ea — 509

2 — —commodo consequat — 510
3 — Duis autem vel eum — 511

3 — iriure dolor in hendrerit — 512
3c — in vulputate velit esse — 513

1 — 3) molestie consequat vel illum dolore eu — 514
1c — feugiat nulla facilisis at vero eros et — 515
1c — accumsan et iusto odio dignissim qui blandit — 516
1c — praesent luptatum zzril delenit at vero — 517
1c — accumsan et iusto odio dignissim qui — 518

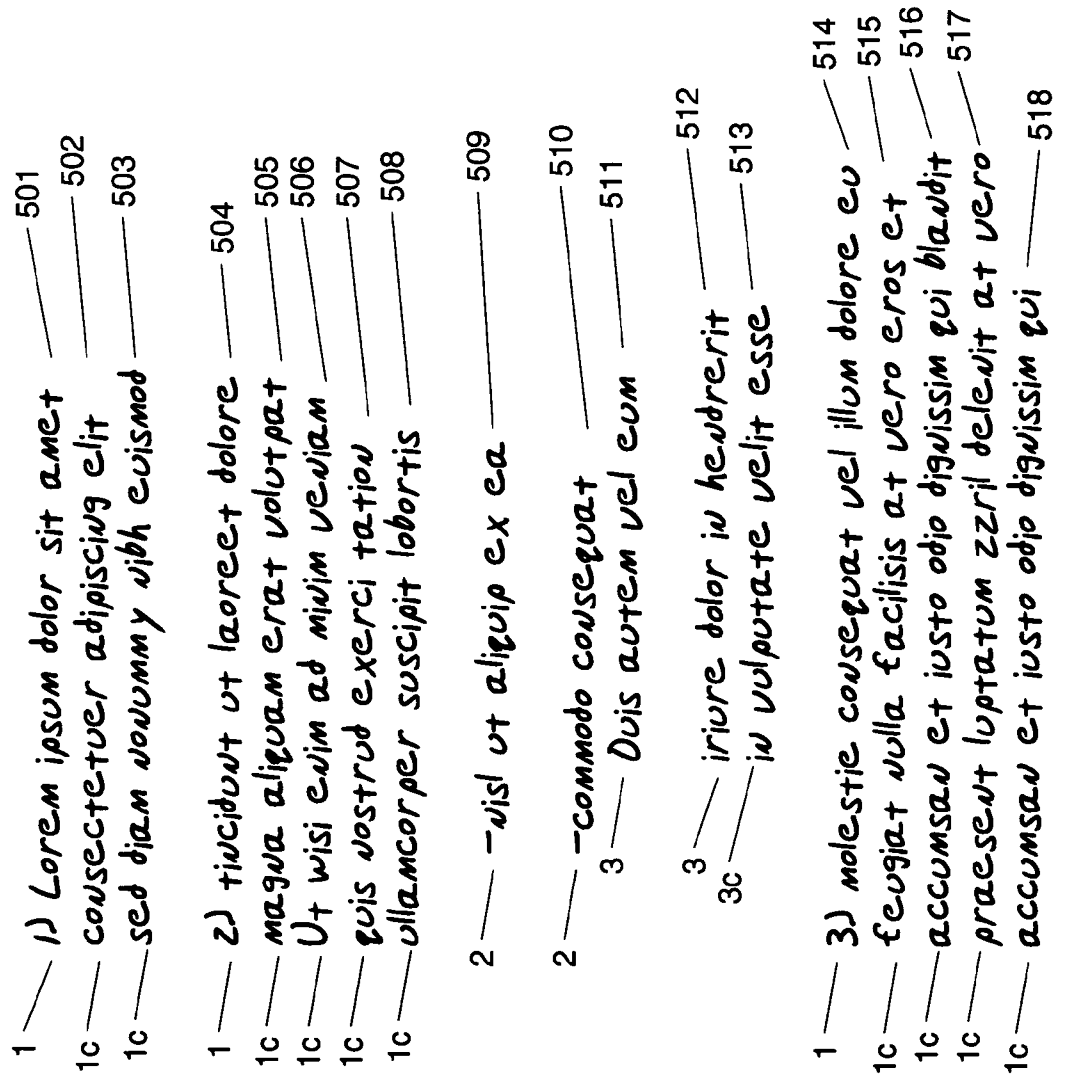

Figure 5

Task (b) — Cyndy Israel 10-9-01    6:30 P.M.

Redmond WA

John Smith, Joe Jones, Kathy Kay, i Sue Cross

Promotion runs Aug 8 — Sept 23, 2002

MBS Ford, Volvo, Dodge

Overview — 1. flood market in Cincinnati w/
    1c — direct mail campaign — new
    1c — postcards & keep in dealers
2. television ad radio — demographics - women 36o

Site Visits 1,0 — Site Visits 2,1 — Pre-meeting info 3,2 — - Permission 3,2 — - Can we videotape? Probably not, but of 3c,2c — yes try to get pre/post interviews 4,2 — * Digital Camera - Book out - capture images 4c,2c — of workspace area / note files 2,1 — Overview of:

3,2 — Functions, job roles, purpose of meeting

→ Any preparation undertaken?

→ Album present? Minutes, Protocol?

PARSING HIERARCHICAL LISTS AND OUTLINES

This application is a Continuation of U.S. application Ser. No. 10/968,813 filed on Oct. 20, 2004, hereby incorporated by reference as to its entirety.

BACKGROUND OF THE INVENTION

1. Field of the Invention

Aspects of the present invention relate to computing systems. More particularly, aspects of the present invention relate to a process for parsing hierarchical lists and outlines from received information.

2. Description of Related Art

People record information in a variety of formats. Sometimes the information is recorded in paragraphs. In some cases, paragraphs are recorded in a hierarchical format in an outlined or bulleted form.

Computing systems have attempted to recognize the format in which people record information. This approach has resulted in computer recognition systems that parse information and attempt to reproduce its form for latter use or modification. Current systems do not adequately parse received information as desired. In many cases, the received information is incorrectly-parsed, thereby making a resulting hierarchical form unusable as the form needs to be edited by a user to achieve a desired form.

An improved parsing system and process are needed.

BRIEF SUMMARY OF THE INVENTION

Aspects of the present invention address one or more of the problems described above, thereby providing a process for robustly parsing hierarchical information.

BRIEF DESCRIPTION OF THE DRAWINGS

The present invention is illustrated by way of example and not limited in the accompanying figures in which like reference numerals indicate similar elements and in which:

FIG. 5 shows another technique for parsing hierarchical information in accordance with aspects of the present invention.

DETAILED DESCRIPTION OF THE INVENTION

Figure 1:
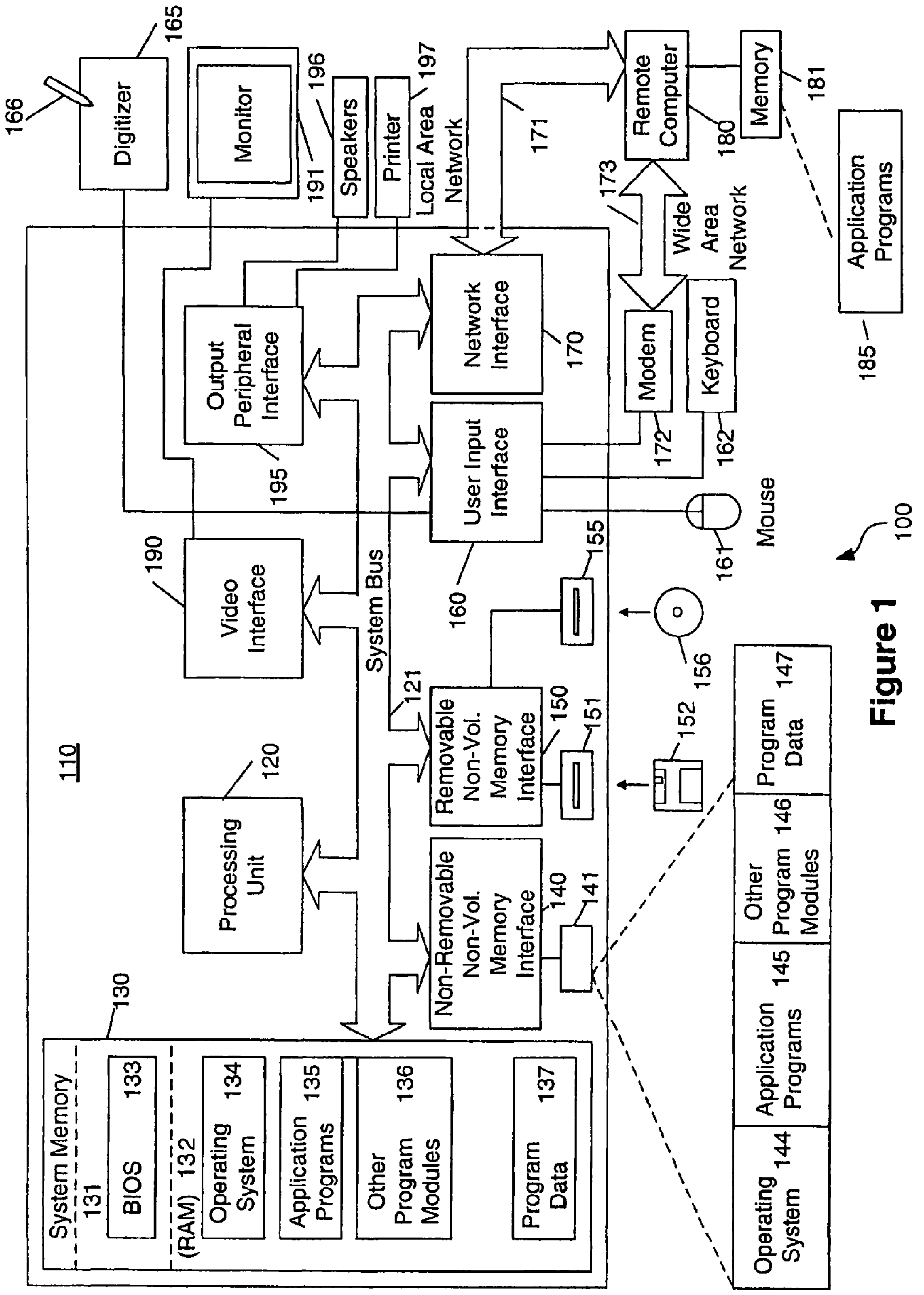
FIG. 1 shows an illustrative example of a general-purpose computing environment in accordance with aspects of the present invention.

Aspects of the present invention relate to parsing and recognizing hierarchical information. Once recognized, labels may be assigned to represent the various hierarchical levels. Subsequent processes may respond to the assigning labels and, for example, modify the hierarchical information.

This document is divided into sections to assist the reader. These sections include: hierarchical information, characteristics of ink, terms, general-purpose computing environment, processes for parsing of hierarchical information, examples of parsing of hierarchical information, and training examples.

It is noted that various connections are set forth between elements in the following description. It is noted that these connections in general and, unless specified otherwise, may be direct or indirect and that this specification is not intended to be limiting in this respect.

Hierarchical Information

Hierarchical information may take many forms including notes, outlines, to-do lists, and the like. Aspects of the invention may be applied to all information that is intended to be recognized as taking some hierarchical form. One subset includes handwritten information, as captured by a digitizing surface present in, for instance, a tablet PC or personal data assistant (PDA). Once a user has information in a hierarchical form, the user may wish to edit, update, or export the parsed information to another program. Here, it is important that the hierarchical structure of the information is determined automatically so that the user is able to use the information without significant editing.

Conditional Random Fields may be used for labeling a 1-D sequence. Aspects of the present invention apply these labels to hierarchical information. In particular, aspects of the present invention label a sequence of lines with values (for instance, {1, 1*c*, 2, 2*c*, . . . }). The values identify the hierarchical relationships that exist between the lines.

While the invention may be applied to all information to be parsed into a hierarchical form, ink structures in particular are frequently hierarchical. In the case of note taking, users typically write out paragraphs, which are composed of lines, lines which are composed of words, and words which are composed of characters (or strokes). Knowledge of this hierarchical structure allows for complex structural editing, such as insertion of a line, moving an entire paragraph, or changing the margin of a paragraph. Interpretation of ink into a hierarchical decomposition of grammatical structures may be relevant when constructing a range of ink-based user interfaces. A significant percentage of spontaneous user notes are in the form of lists (shopping lists, to-do lists, outlines, etc). Many of these lists are hierarchical and have more than one level. For example, it is not unusual for each item in a "to-do list" to be composed of a list of steps or requirements. Automatic interpretation of these structures may support improved user interfaces in which sub-trees can be moved or collapsed dynamically, or importation into document preparation systems with appropriate formatting.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All these characteristics can be used as well.

Terms

| Term | Definition |
|---|---|
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Stroke | Point Information defining a location in space. For example, the points may be defined relative to a capturing space (for example, points on a digitizer), a virtual ink space (the coordinates in a space into which captured ink is placed), and/or display space (the points or pixels of a display device). |
| Document | Any electronic file that has a viewable representation and content. A document may include a web page, a word processing document, a note page or pad, a spreadsheet, a visual presentation, a database record, image files, and combinations thereof. |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or another appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
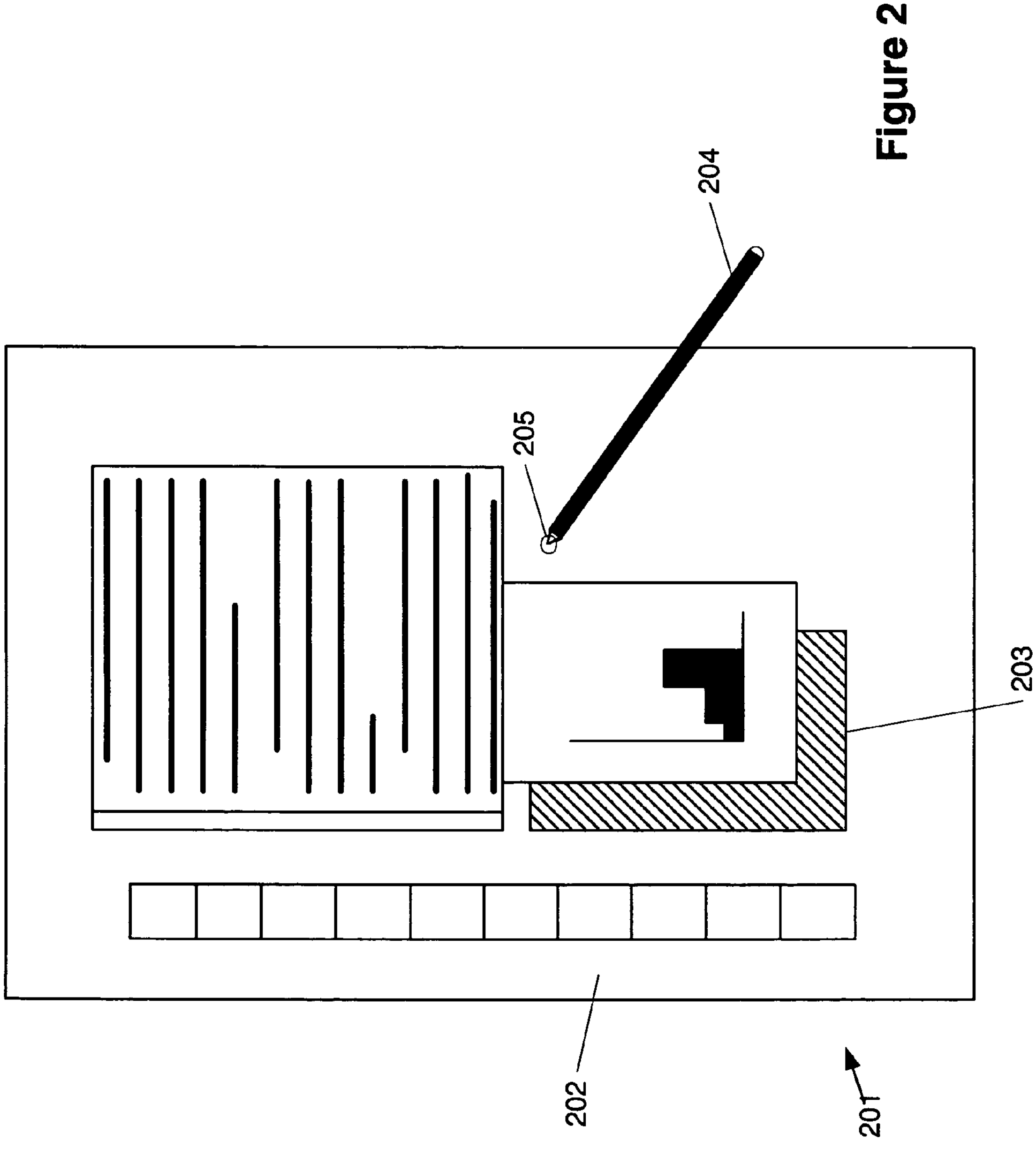
FIG. 2 shows an illustrative example of a tablet computer in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Processes for Parsing of Hierarchical Information

Figure 3:
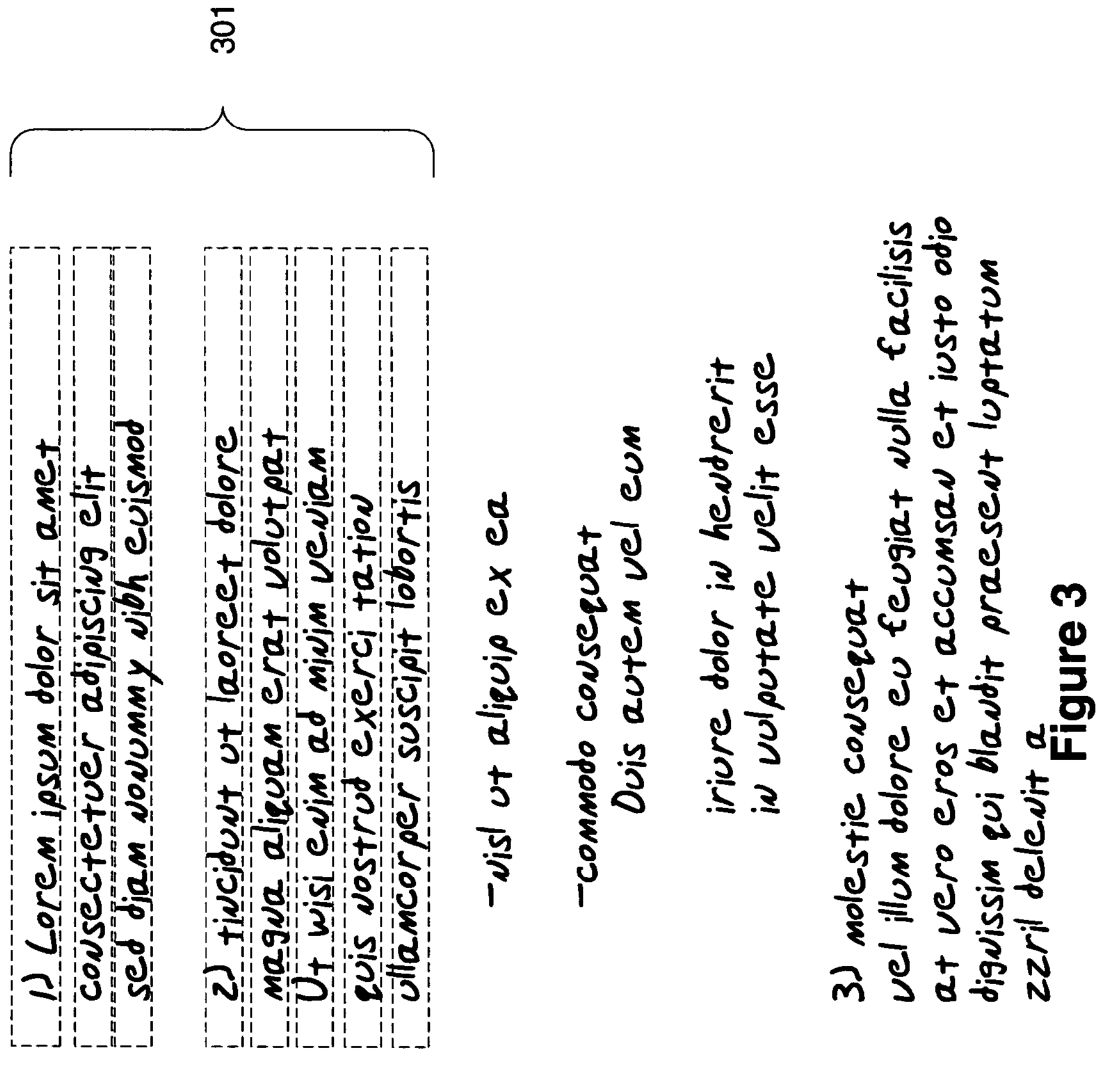
FIGS. 3-4 show various techniques for parsing hierarchical information.
Figure 4:
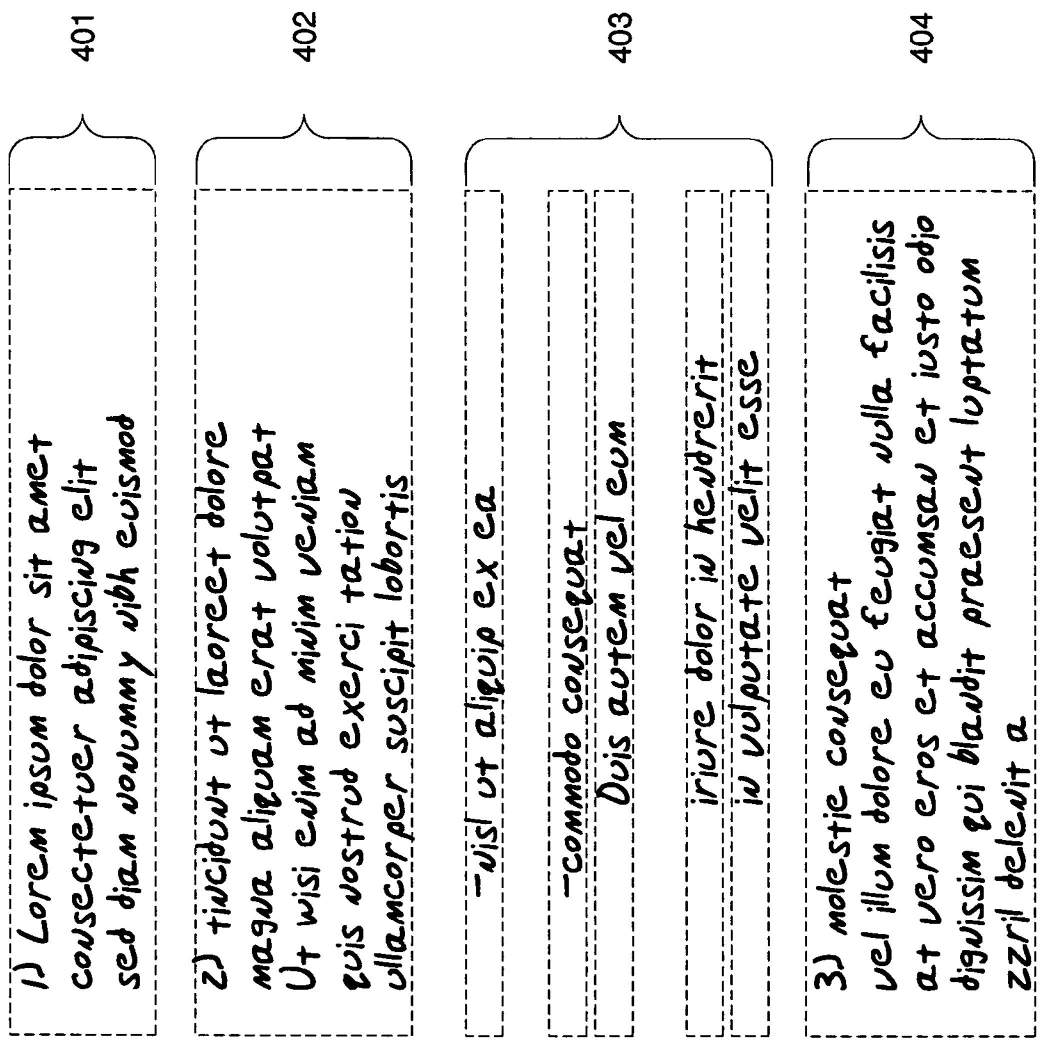

FIGS. 3-5 show various examples of parsing hierarchical information. In FIG. 3, hierarchical information is parsed with every line being considered separate from each other line. While a user viewing the hierarchical information may note the information appearing in an outlined format, a parser of FIG. 3 has only identified each line separately 301. A parsing of this type is detrimental for reusing the parsed content. While a user may immediately recognize the information wrapping from one line to the next, the parser believes each line is a separate paragraph. The separate lines make modification or repurposing (for instance, converting to text) difficult because any new line wrapping would create new lines, not reformat the existing lines.

In FIG. 4, the parsing system of this example has identified lines into groups (for instance, groups 401, 402 and 404) as having the same hierarchical level. However, the parsing system has not identified the content of section 403 relating to the hierarchy of sections 401, 402, and 404. While a user may readily see how the lines of section 403 fit into the hierarchy of sections, the parser of FIG. 4 has only grouped lines having no left indent. Lines with a left indent (those in group 403) are considered separate and not part of the hierarchy of groups 401, 402, and 404.

In FIG. 5, the parsing system has identified each line as associated to other lines in the hierarchy. FIG. 5 shows a total of 18 lines, of which there are 7 nodes, with each node being a separate paragraph. The paragraph start lines are lines 501, 504, 509, 510, 511, 512, and 514 (these lines also include an identifier of a whole number $\{0, 1, 2, 3 \ldots N\}$). The remaining lines are continuation lines represented here by the preceding whole number follows by a "c". Of course, any other identification scheme may be used. Here, the labeling scheme is used to help identify to the reader how the hierarchical information is identified.

All hierarchical information includes a root node. Other nodes form a tree that expresses the hierarchical nature of the information. Here, the other nodes of the tree contain blocks of text and may have a number of children. The rendering of the outline tree adds some complexity to the observed text as shown in FIG. 5. Each node may or may not be preceded by some form of bullet perhaps a symbol, number, letter, or their combination. The depth of the node in the tree determines the selection of the bullet and the formatting of the text in the node. Nodes which are deeper in the tree are typically indented further from the left margin. Additionally, long text blocks which cannot fit on a single line are wrapped to form "continuation" lines. Continuation lines are not bulleted and may have a different left indent than the initial bulleted line. It is important to emphasize that there are many possible ways of rendering the same outline structure. The user can select different types of bullets or different indentation schemes.

The set of observed bullets is quite large and may include: symbols such as dashes, stars, or dots; numbers such as 1, 2, 3 or i, ii, iii; and letters such as A, B, a, b, or c or combinations or alternatives. Each of the bullet types might include an embellishment such as a parenthesis, period, or colon. In some cases list items have no labels at all.

Figure 6:
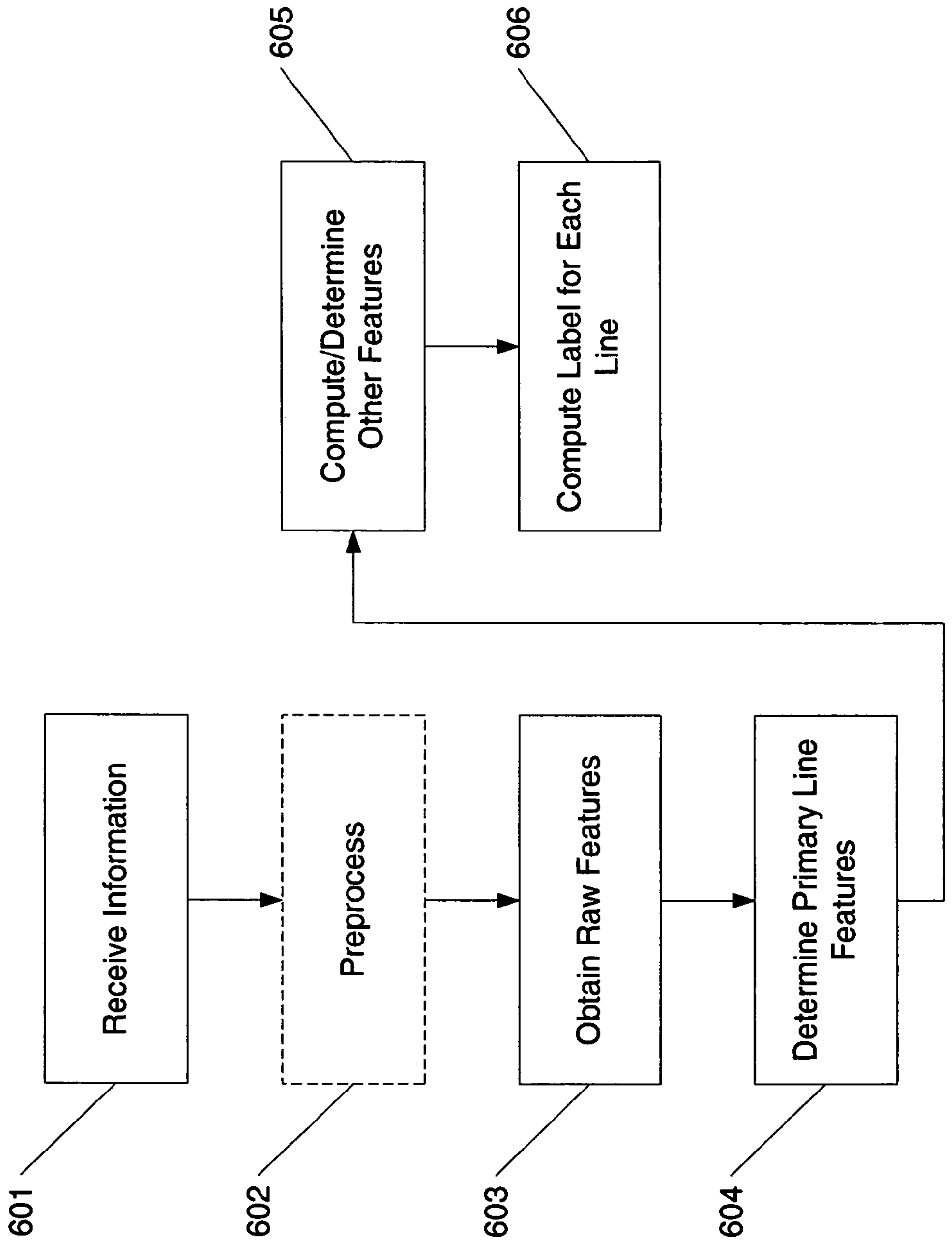
FIG. 6 shows processes for assigning labels to hierarchical information in accordance with aspects of the present invention.

FIG. 6 shows a process for parsing received information into a hierarchical structure. Once the structure has been determined, the information may be manipulated by other applications and/or user. Information is received in step 601. In step 602, the received information may be rotated to adjust for any rotation in the lines of information. Further, the system may determine whether graphical elements exist in the received information and segments and removes the information assumed to be the graphical elements. If the received information is ink, then strokes are assumed to be already grouped into words and lines. The system then groups the lines into blocks. Finally annotations may be segmented and removed.

Steps 603-606 relate to determining a hierarchical tree structure from the observed lines of information. The following describes a learning approach, which has been trained from a training set of examples for the key regularities necessary to label additional examples.

Two observations make the inference of outline structure much simpler. The first is that the lines within each block are naturally ordered from top to bottom on the page and that the nodes in the tree have the same depth first order. The second observation is that the hierarchical structure can be efficiently encoded by assigning each line a label. The labels encode both the depth of the node in the tree and whether the line is a continuation of the previous line (see FIG. 5). Given these two observations, the inference of the outline tree may be achieved as a line classification problem, where each line is classified into one of N depths and as a continuation or non-continuation. From the classification for each line, the tree structure can be computed in one pass. The issue then is how to classify each line.

The lines in each block of text are labeled using a Markov modeling framework introduced by Collins, referred to herein as the Collins Model. The Collins model is a more powerful generalization of a Hidden Markov Model. Like a hidden Markov model, the parameters of a Collins model are estimated using a set of training data.

As described above, the Collins model may be used for parsing ink into hierarchical form. Also, other models may be used. As an example, an alternative model is to classify each line based on features computed from that line alone. Using the examples from below, a number of features may be computed for each line. Examples include: “left indent”, “right indent”, “left indent relative to the previous line”, “is a bullet present”, etc. Using these features, one can attempt to learn a function that will correctly classify the line’s depth and continuation. This simple scheme, because it is independent from line to line, has a difficult problem in labeling lines because context is very important. One simple extension is called “stacking”. In this case the features of the current line and the features of the surrounding lines are used as input to the classifier for each line (the features are “stacked” into a single input vector). While this improves performance, the dependence between labels is not modeled.

The more powerful model is one that both stacks input features and propagates label dependencies. Hidden Markov models are appropriate for this process, but one technical assumption is violated, namely the independence of the observations given the hidden state. Since the input features are stacked, the same feature value appears many times for different input times. This is a serious violation of independence as required by the hidden Markov model. The Collins model addresses some of these issues. Other approaches that may be used include Conditional Random Fields and other non-generative Markov processes.

The Collins model and related models are beyond the scope of this description. Only the details related for an understanding of the operation and training of the model are described.

The model operates as follows: given a sequence of observations $s_t$, a sequence of labels $l_t$ is desired. A Collins model uses a set of features $f_i(l', l'', s, t)$, which are binary functions of a pair of labels, a sequence of observations s, and the time (or position in the sequence). The cost of a label sequence is defined as:

$$C(L, s) = \sum_t \sum_i \lambda_i f_i(l_t, l_{t-1}, s, t)$$

where L is a sequence of labels in time $\{l_t\}$ and $\lambda_i$ are the model parameters. Given many labeled training examples $\{L^k, s^k\}$, the learning process attempts to find a set of weights $\{\lambda_i\}$ such that $$\hat{L}^k = \arg_L \min C(L, s^k) = L^k.$$

Note that each feature depends only on a pair of adjacent states. Of course, this may be modified to include additional states.

As a result terms from the summation may be divided into independent groups. This leads to an efficient minimization using dynamic programming (the algorithm is essentially equivalent to Vitterbi decoding of HMMs). The features as expressed above are in an abstract form, which does not provide much intuition for their operation.

In order to give provide a better understanding of the purpose and meaning of the features, It is valuable to consider a few examples. One may consider a particular form of feature which ignores the observations and time altogether. These could be rewritten as $f_i\{l_t, l_{t-1}\}$. One particular feature, for instance $f_{T14}$, returns the value 1 if $l_{t-1}=1$ and $l_t=4$ and 0 otherwise (i.e. the state has transitioned from a line at depth 1 to depth 4). This transition is impossible due to the nature of the outline tree. To ensure that the model never outputs impossible labels, the learning process could assign the corresponding weight $\lambda_{T14}$ very large positive value. As a result any hypothetical label sequence including this transition is assigned a high cost. Conversely, $f_{T12}$ (which tests for a transition from depth 1 to 2) is a common occurrence could be assigned a negative or small positive weight.

Another type of feature can be used to encourage particular states. For example the hypothetical feature $f_{s1\_indent<20}$ returns 1 if the current state is 1 and the left indent of the current line is less than 20 millimeters. This is a fairly common occurrence and it should be assigned a negative weight. The feature $f_{s1\_indent>500}$ is an uncommon occurrence and should be assigned a large positive weight.

The most complex type of feature relates two labels given some property of the observation. For example $f_{T1\_relindent<20}$ returns 1 if the current and previous labels are both 1 and the relative indent between the lines is less than 20 millimeters. This too is a common occurrence and it should be assigned a negative weight.

Of course none of these weights are assigned by hand. Given a large set of features and a large set of examples, the Collins model is trained iteratively by gradually adjusting the weight vector until convergence.

The following describes extracting line features. The input to the feature extractor is a block of correctly grouped lines which have similar but otherwise arbitrary orientation. The first preprocessing step is to compute the line rotation angles and define the block coordinate. Then one can compensate for the rotation angle and proceed assuming all lines are horizontal and up-right.

Aspects of the present invention first determine a set of basic line features. These basic line features may be referred to as raw features. They include: the left, right, top and bottom line bounds, indent level and bullet type. Calculating the line bounds is straightforward (although care needs to be taken in computing the top and bottom bounds because ink lines are not straight and the ascenders and descenders can be quite irregular). The procedures for indent level estimation and bullet detection are described below.

Indent Level Estimation: Indent levels are quantized left indentations. Although the indent lengths may differ greatly between examples, the indent levels are relatively stable, roughly corresponding to the outline depths (see FIGS. 8-10 below). The motivation for indent level estimation is to provide an approximate measure of the depth. Any standard method can be applied to this quantization problem. One may use the K-means algorithm: starting with an equidistant array of cluster centroids, assign the observations to the nearest centroids, update the centroids with the new members and iterate until the centroids no longer change. It is often observed in ink notes that the indent lengths of the same level gradually drift down the page. In such cases, quantizing the absolute indents directly may bury actual levels in spurious detections.

To alleviate this problem, one may carry out quantization in two passes. In the first pass, one may quantize relative indents and group neighboring lines that have zero relative indents. In the second pass, one may quantize the average absolute indents of the line groups. Alternatively, no quantization may be performed.

Bullet Detection: Lists are very common structures in ink notes. Bullets signal the start of list items (paragraphs) and their presence can greatly reduce the uncertainty of outline labeling. The following describes a rule-based bullet detector which recognizes a small set of symbols and symbol-embellishment patterns, and exploits consistency between bullets to boost detection confidence. The algorithm comprises four steps. First, for each line, one may generate several bullet candidates from the stroke clusters at the beginning of the line. Secondly, for each candidate, one computes features (such as width, height, aspect ratio, spatial and temporal distances to the rest of the line, etc.), try to recognize it as one of the types such as "dash" or "ending with a parenthesis" (e.g., "1.a)"), and assign it a score in [0, 1] indicating the certainty of the candidate being a bullet. Thirdly, a score in [0, 1] is computed for each pair of candidates indicating the degree of similarity between them. The final score of each candidate is a weighted sum of its self-score and all of its pair-scores, reflecting that the more the candidate looks like of a known bullet type AND the greater number of other candidates which resemble it, the more likely this candidate is an actual bullet. One may then accept a candidate and remove all of its conflicting candidates in a highest-confidence-first fashion, until all candidates have been processed or the highest score falls below a certain value. Preliminary experimental results have shown that this method is effective in detecting common ink bullets such as dashes, dots, alphanumeric-dot combinations and even bullets of unknown types. The features it computes can also be utilized in learning-based bullet recognition.

The following describes primitive line features. The following table shows the primitive line features that may be used to produce test results. The features are divided into three categories depending on how much context Δt is used in their computation:) 0(=Δt means only the raw features of line t are used;) 1(=Δt means the previous or next neighbor's raw features are also used, and so on. Length features can be normalized by various global statistics such as the average line height in the block.

| Content | Features | Normalization |
|---|---|---|
| Δt = 0 | Line height | 0, 1 |
| | Line width | 0, 1 |
| | Left indent | 0, 1 |
| | Right indent | 0, 1 |
| | Indent level | |
| | Is the first line in the block | |
| | Is a bullet present | |
| | Is the bullet of type X | |
| | Right indent normalized by the block width | |
| Δt = 1 | Relative left indent | 0, 1 |
| | Relative right indent | 0, 1 |
| | Inter-line distance | 0, 1, 2, 3 |
| | Same "is a bullet present" status | |
| | Same bullet type | |
| | Relative indent level | |
| | Is relative indent level positive/negative | |
| | The pair's line height ratio | |
| | Relative right indent normalized by the larger line width | |
| Δt > 1 | Is the indent level different from its 4 neighbors' indent level | |
| | Is the line continuation of a list item | |
| | Ratio between the next and previous inter-line distances | |

For this table, normalization schemes may include the following: Normalization schemes: 0—not normalized, 1—by average line height, 2—by the minimum interline distance, 3—by the median interline distance. All listed schemes for a feature are used.

Apparently, there are many meaningful ways of combining raw/derived features and what Table 1 enumerates is merely a small portion. Instead of hand-engineering more features, the following takes a systematic approach to this problem.

The following describes how to combine primitive features into Collins Model features. Recall that the Collins model requires features of the form $f_i(l', l'', s, t)$, which are dependent both on the current state (or pair of states) and the observation sequence. These features are formed from the primitive features using the training set.

Combination Filters. Based on the initial set of hand constructed filters, a set of combination filters are constructed. Each computes a random linear combination of a random subset of the hand constructed filters.

Binary Features. The mean and the variance for each continuous valued feature are estimated from the training set. The range is then portioned into 6 bins each 1 standard deviation in width. A total of 6 binary features are created from each continuous feature. The binary feature takes on the value 1 if the continuous feature falls in the corresponding bin, and zero otherwise.

Observation Features. One feature is generated for each triple {s,i,v}. The feature returns 1 if the current state is s and binary feature i=v. Only those features which return 1 for some example in the training set are retained.

Transition Features. One feature is generated for each quadruple {s, s', i, v}. The feature returns 1 if the current state is s, the previous state is s', and binary feature i=v. Only those features which return 1 for some example in the training set are retained.

Examples of Parsing of Hierarchical Information.

The following provides results of experimental data with a collection of 522 ink files created in Windows Journal® (by the Microsoft Corporation) on a TabletPC. All these files contain substantial handwritten script showing interesting outline structures. The median and maximum numbers of lines in a block from this set are 15 and 66 respectively. Strokes in each outline block have been correctly grouped into words and lines. Each line is labeled with its depth and if it is a continuation: title lines are labeled as 0 or 0*c*, the rest lines are labeled as 1, 1*c*, 2, 2*c* and so on. Five examples are given in FIGS. 8-12.

The ground truth label for each line is shown as the only or first value in each label. The table may be partitioned into three sets: 371 for training, 75 for evaluation (observing if accuracy improves with the number of iterations) and 76 for final testing, roughly according to a 5:1:1 ratio. The following parameters are used in training: learning rate 0.2, decay rate 0.9 and number of iterations 10. The total number of filters used by the Collins model is 6058, which includes 57 raw line features, 228 "stacked" filters, 1135 binarized filters. The remaining filters are equally split between OBSERVATION and TRANSITION. All experiments were carried out on an Intel 3 GHz PC with 2 GB RAM. Training takes about 28 minutes for 446 examples. Decoding is fast, taking 0.9 seconds for the largest file (66 lines). Note that neither the training nor the decoding program has been optimized for speed, and none of the parameters has been finely tuned.

The inference of outline labels can be considered as a two component classification problem, one dimension being the depth and the other being the continuation status. When only the continuation dimension is concerned, the problem reduces to paragraph segmentation—labeling each line as 1 (paragraph start) or 1c (paragraph continued). Paragraph segmentation first is performed because finding paragraphs is a significant problem by itself and paragraph features can be very useful for outline classification. With good paragraph segmentation results available, outline features such as "is the line continuation of a list item" (Table 1 above) can be computed much more reliably. Also, there exists some correlation in the outline label set {0, 0*c*, 1, 1*c*, 2, 2*c*, . . . }—a 3*c* line becomes 3*c* largely because it follows a 3 line but otherwise it is not much different from other continuation classes. Such correlation introduces a certain amount of ambiguity into the outline classification results. The paragraph segmentation results are not affected by the correlation and incorporating them into outline classification helps to alleviate the ambiguity.

Finally, compared to outline inference, paragraph segmentation is a more suitable test bed for the algorithmic framework because there is much less labeling ambiguity and there is more data relative to the number of classes and hence the results more truthfully represent the algorithm performance.

Figure 7:
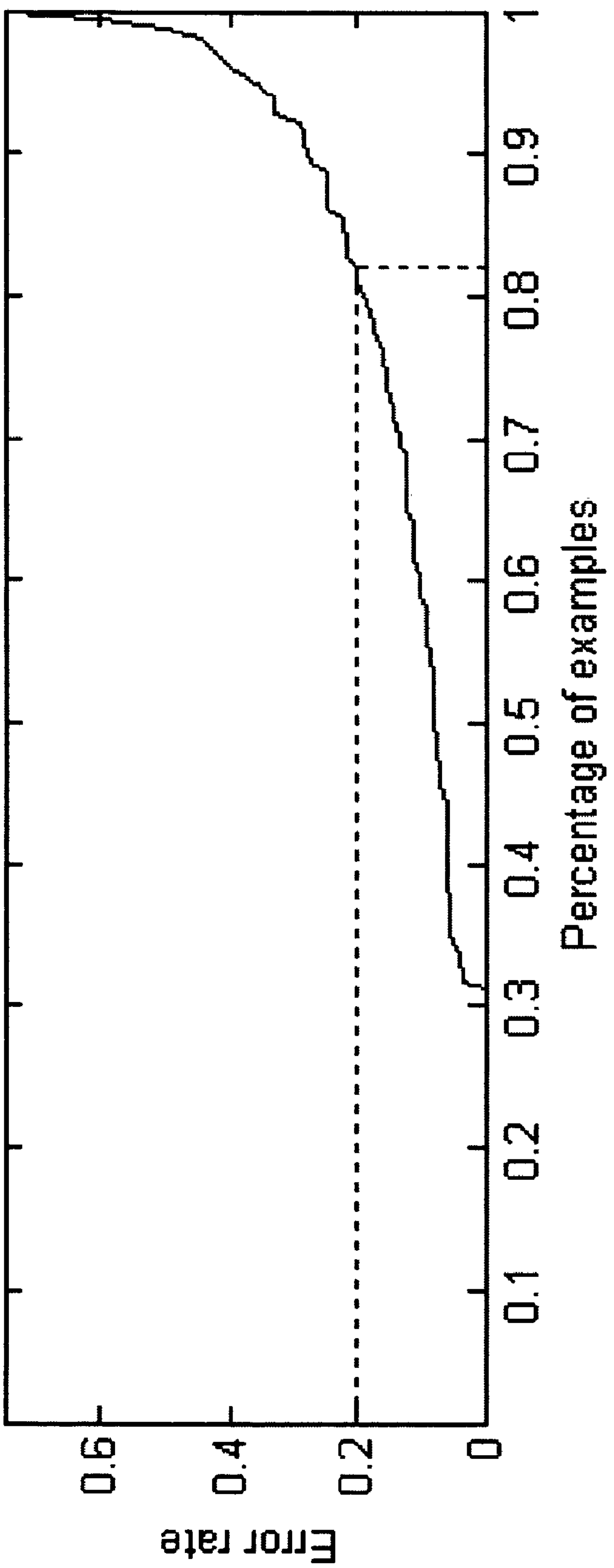
FIG. 7 shows a comparison of percentage of errors versus a realized error rate in accordance with aspects of the present invention.

The following describes paragraph segmentation. The outline classification code can work directly on paragraph segmentation after mapping the ground truth labels from {0, 0*c*, 1, 1*c*, 2, 2*c*, . . . } to {1, 1*c*}. One may measure the error on each example by the percentage of misclassified lines. Three types of error statistics are summarized in Table 2. FIG. 7 is a plot of sorted errors on the 151 evaluation and testing examples. The curve remains low and flat except for a sharp rise towards the end, meaning that the algorithm performs fairly well on the majority of notes and errors concentrate on a very small set of cases.

| | Training | Evaluation | Testing |
|---|---|---|---|
| Number of examples | 371 | 75 | 76 |
| Average percentage of misclassified lines | 7.1 | 11.4 | 10.4 |
| Percentage of files having 0% error | 38.4 | 28.0 | 34.2 |
| Percentage of files having 20% errors or less | 88.2 | 80.0 | 84.2 |

Figure 8:
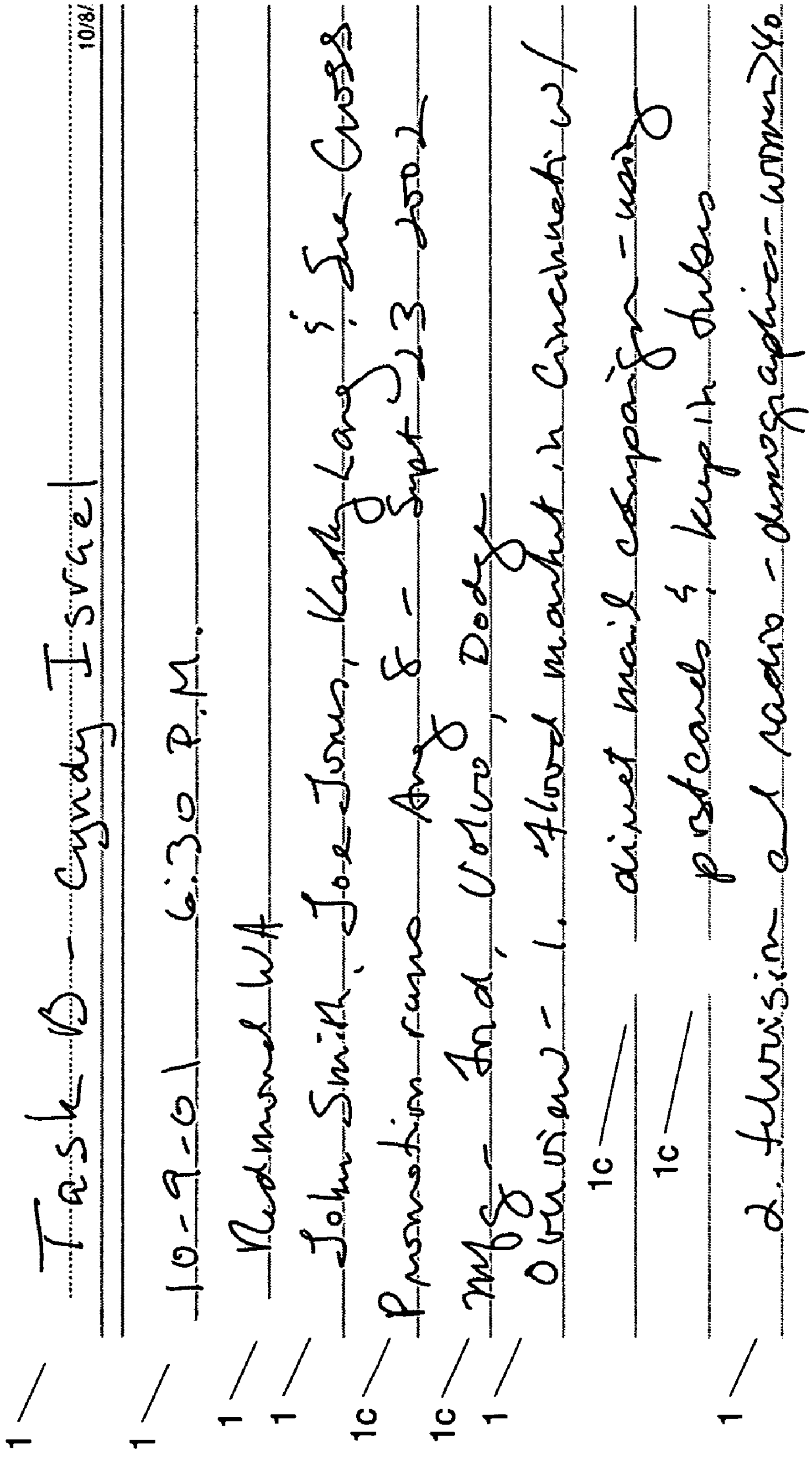
FIGS. 8-12 show various examples of hierarchical information in accordance with aspects of the present invention.
Figure 9:
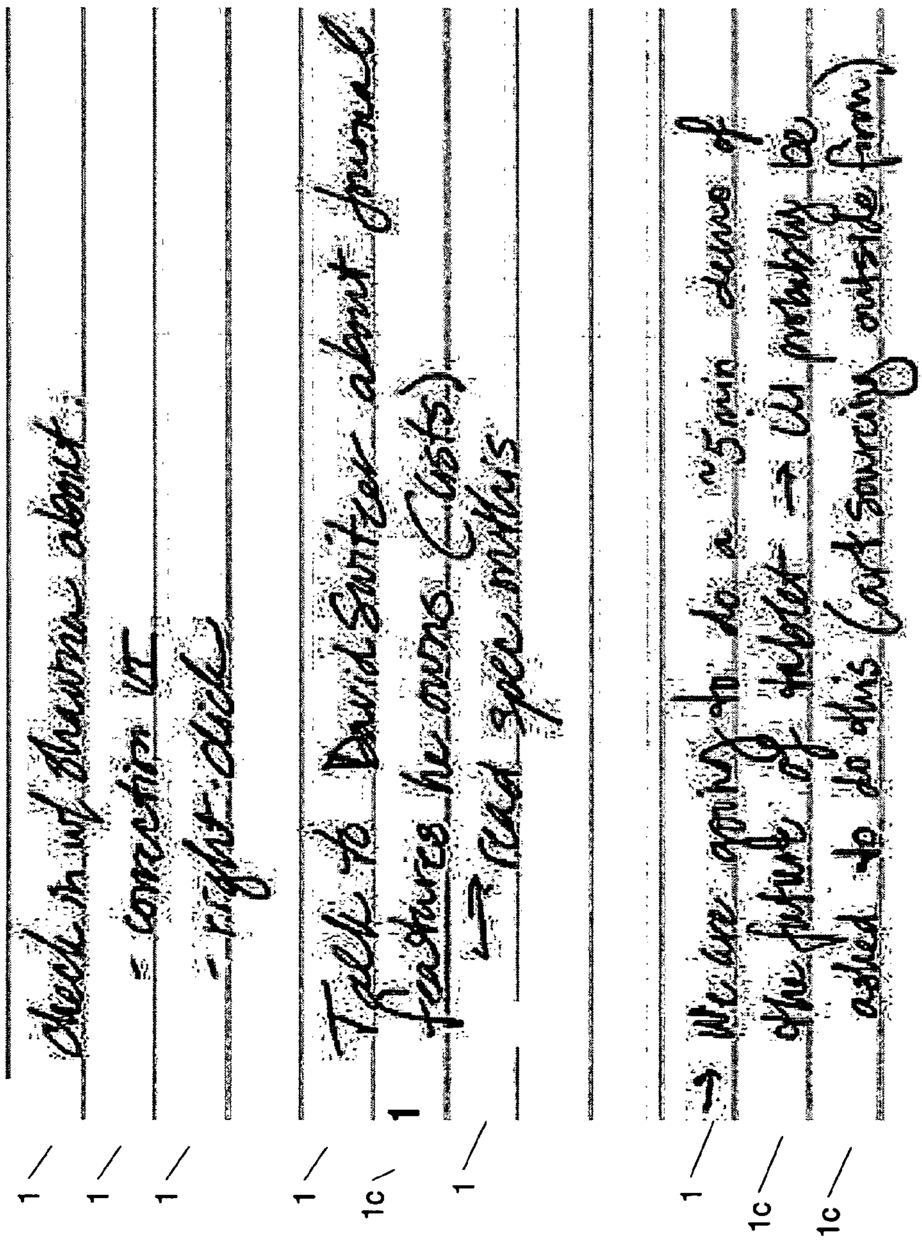
Figure 10:
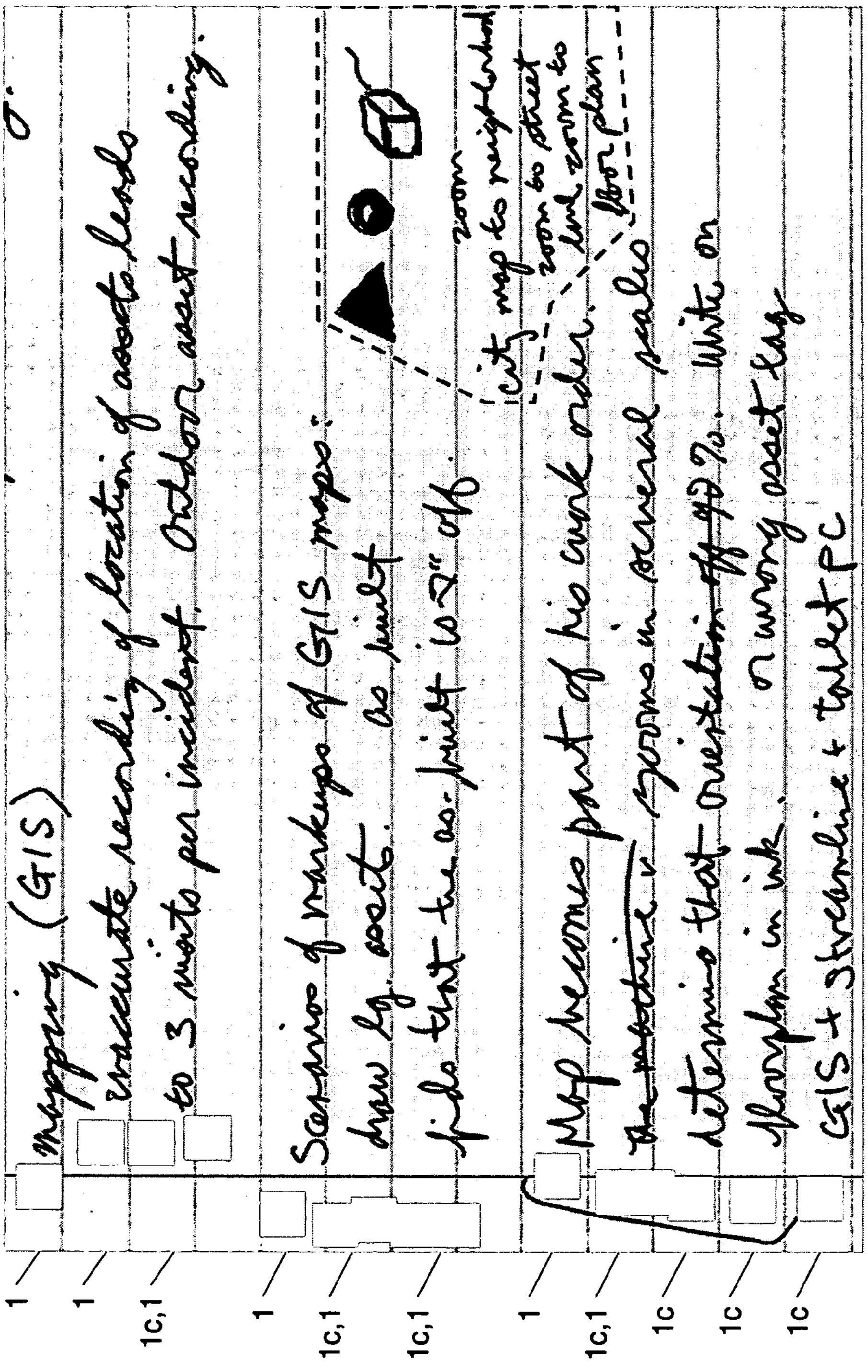

When examining the failure cases, three factors emerged as the major sources of errors. The first is bullet detection error. The only misclassification in FIG. 9 is due to the arrow bullet not being recognized. The second cause is that currently the system does not consider interaction between the outline structure and the rest of the page. The errors around the middle section in FIG. 10 are largely due to the removal of the graphical strokes and annotation by the side (in the dashed polygon). The third cause is ambiguity without full recognition. This technique mainly relies on geometric features and it can only do as well as one browsing ink notes without carefully reading into the content. For example, FIG. 8 shows an example with no errors. At a glance, the results look right. However, once one reads the sentences, it becomes clear that the 5th and the $6^{th}$ lines should actually be labeled as 1. Such ambiguous cases are hard to label as well as to infer. Refining features and collecting more training data may help disambiguate some of the cases.

Potentially the error patterns can also be incorporated into UI design and user adaptation to improve parsing accuracy and end-to-end inking experience. FIG. 7. Sorted errors on the evaluation and testing examples. 82% (124 out of 151) examples have 20% or less misclassified lines.

The following describes outline labeling. By first running the paragraph segmentation algorithm, some paragraph features can be added to the outline labeling system (Table 1), and then the same training and decoding programs apply. One primitive paragraph feature one may include is "is this line a paragraph start". Again, the error is measured on each example by the percentage of misclassified lines and reports the error statistics in Table 3 below.

| | Training | Evaluation | Testing |
|---|---|---|---|
| Number of examples | 371 | 75 | 76 |
| Average percentage of misclassified lines | 32.7 | 39.6 | 48.1 |
| Percentage of files having 0% error | 17.5 | 17.3 | 9.2 |
| Percentage of files having 20% errors or less | 43.2 | 34.7 | 34.2 |

Figure 11:
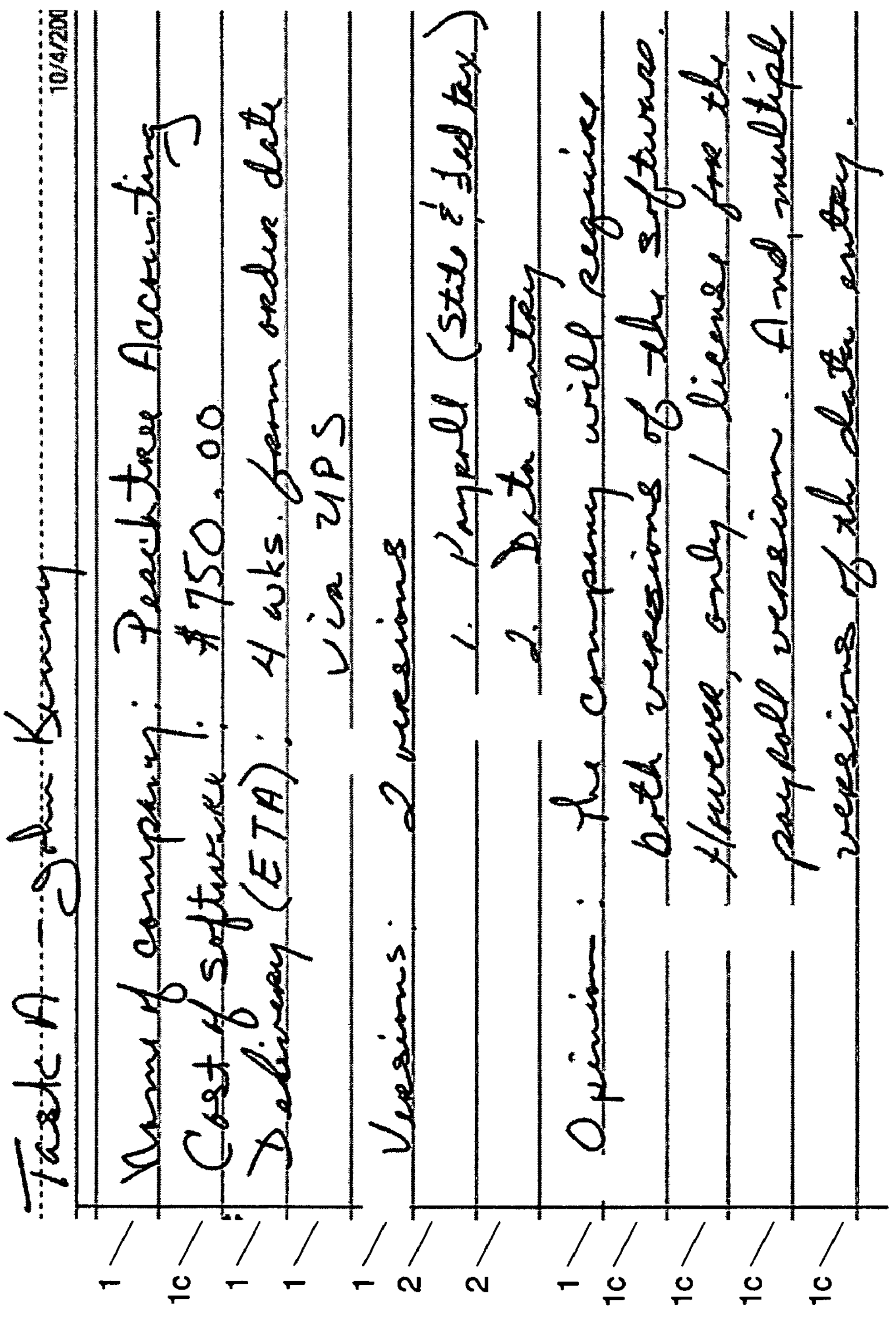
Figure 12:
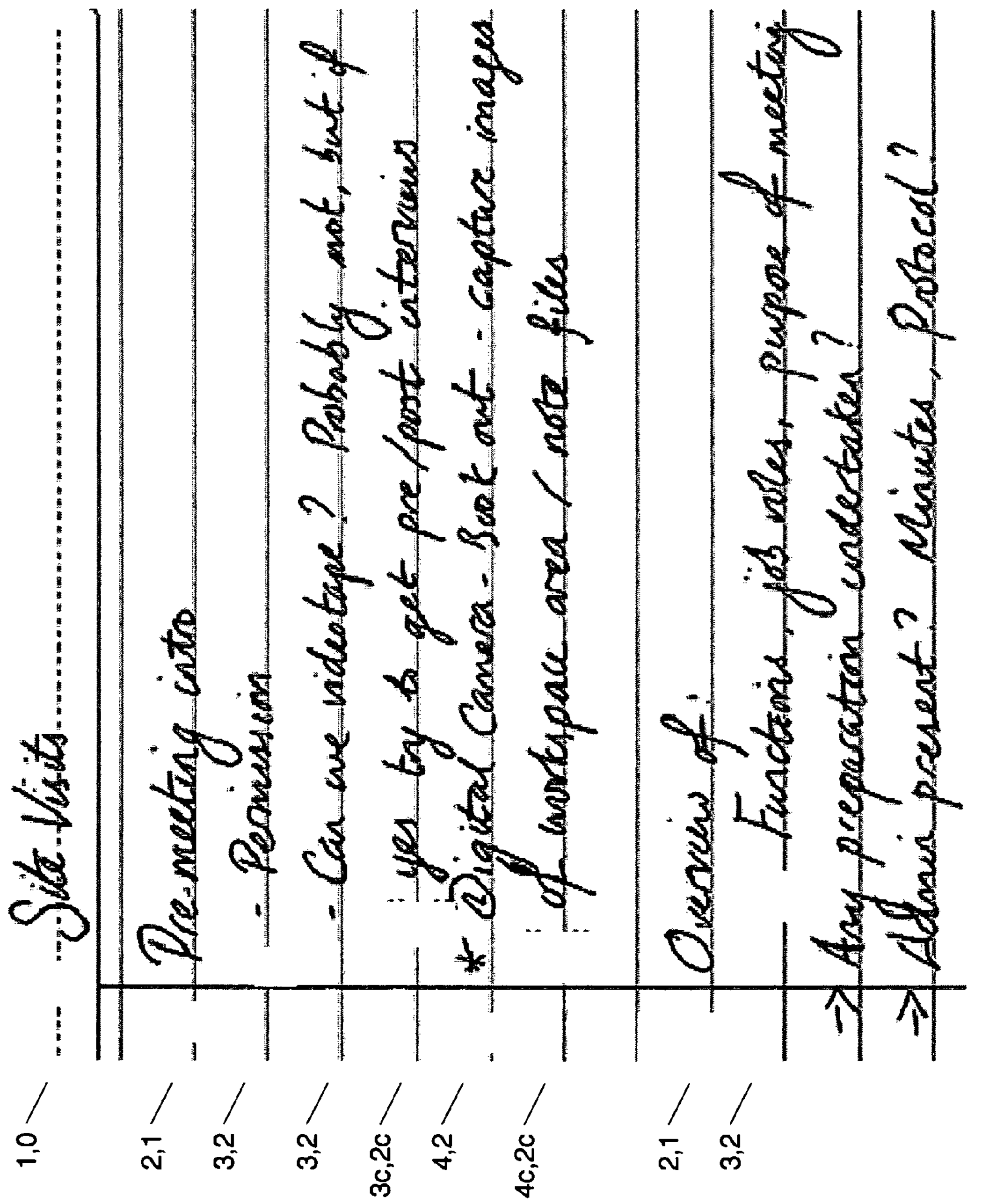

FIGS. 11 and 12 show outline inference examples. Ground truth labels are shown as the first or only value. Predicted labels, if different from the ground truth, are shown right after ground truth values, if at all.

There is a lot of ambiguity in outline structures. It makes data labeling, training and performance evaluation much harder than in the paragraph segmentation problem. Ground truth data may be labeled by hand, and is therefore subjective and includes significant variations. Variation between such alternative decisions for different example exists. This obscures boundaries between classes and makes training less effective. FIG. 11 is an example that is almost correct and FIG. 12 is an example that is almost entirely wrong. However, a closer examination reveals that these two files actually have similar structures and similar inference results. The discrepancy in the error rates is largely due to labeling ambiguities: (i) by labeling the title line in FIG. 12 as a 1 instead of 0, most results are off by one depth level from the ground truth; (ii) the 3rd line in FIG. 11 requires understanding the content to parse right; (iii) the user intention for the 5th and 6th lines is unclear even after careful reading—both the ground truth and the inferred results seem plausible.

When exposed through user interfaces, many "errors" such as (i) may not even be noticeable by the user. This is because the labels may be absent from the display, rather only the relationships established by the labels preserved. In addition, users' tolerance of errors increases with the amount of ambiguities; errors such as (ii) and (iii) are unlikely to cause much annoyance. The simplistic error metric one may use to produce the numbers in Table 3 does not reflect user experience well and should be interpreted with caution.

Hierarchical outline structure commonly occurs in user notes. Users want a scheme for editing the structure of these outlines, and perhaps for exporting them to word processing programs. The preceding description describes a system which interprets handwritten outline and automatically extracts the correct structure with good reliability.

The described system attempts to label each line in a block of text with its "depth" in the outline tree and flags those lines which are part of the same tree node. A Markov model introduced by Collins is used to classify the lines. This model combines available line features, such as indentation and length, to find a globally consistent assignment of line labels. The parameters of the Collins model may be learned from a set of training data. As a result the system is more robust than a hand engineered system. Finally, computation of the line labels is fast, requiring less than 0.1 seconds on typical ink pages.

Training Examples

Figure 13:
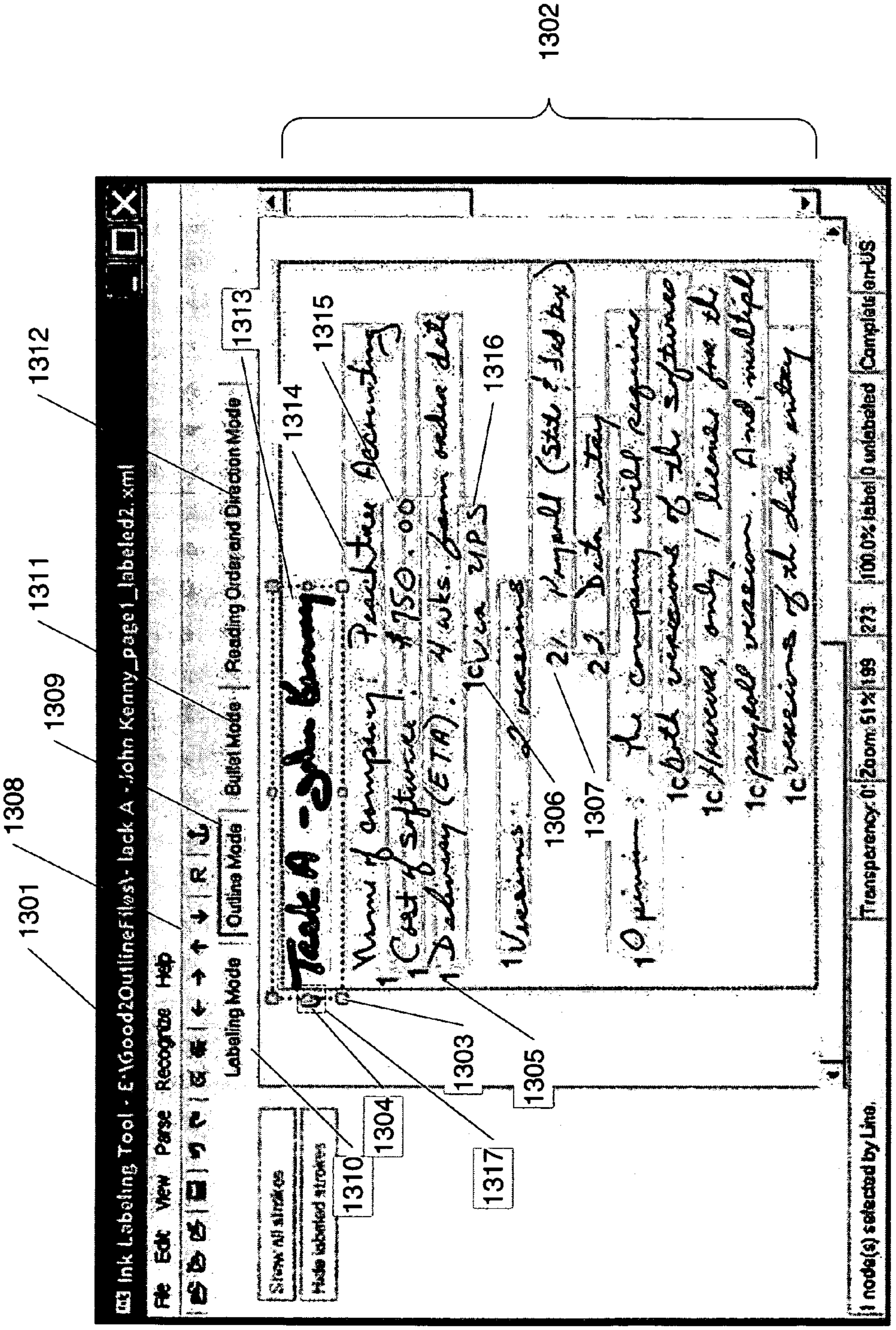
FIG. 13 shows a user interface for creating training examples in accordance with aspects of the present invention.
Figure 14:
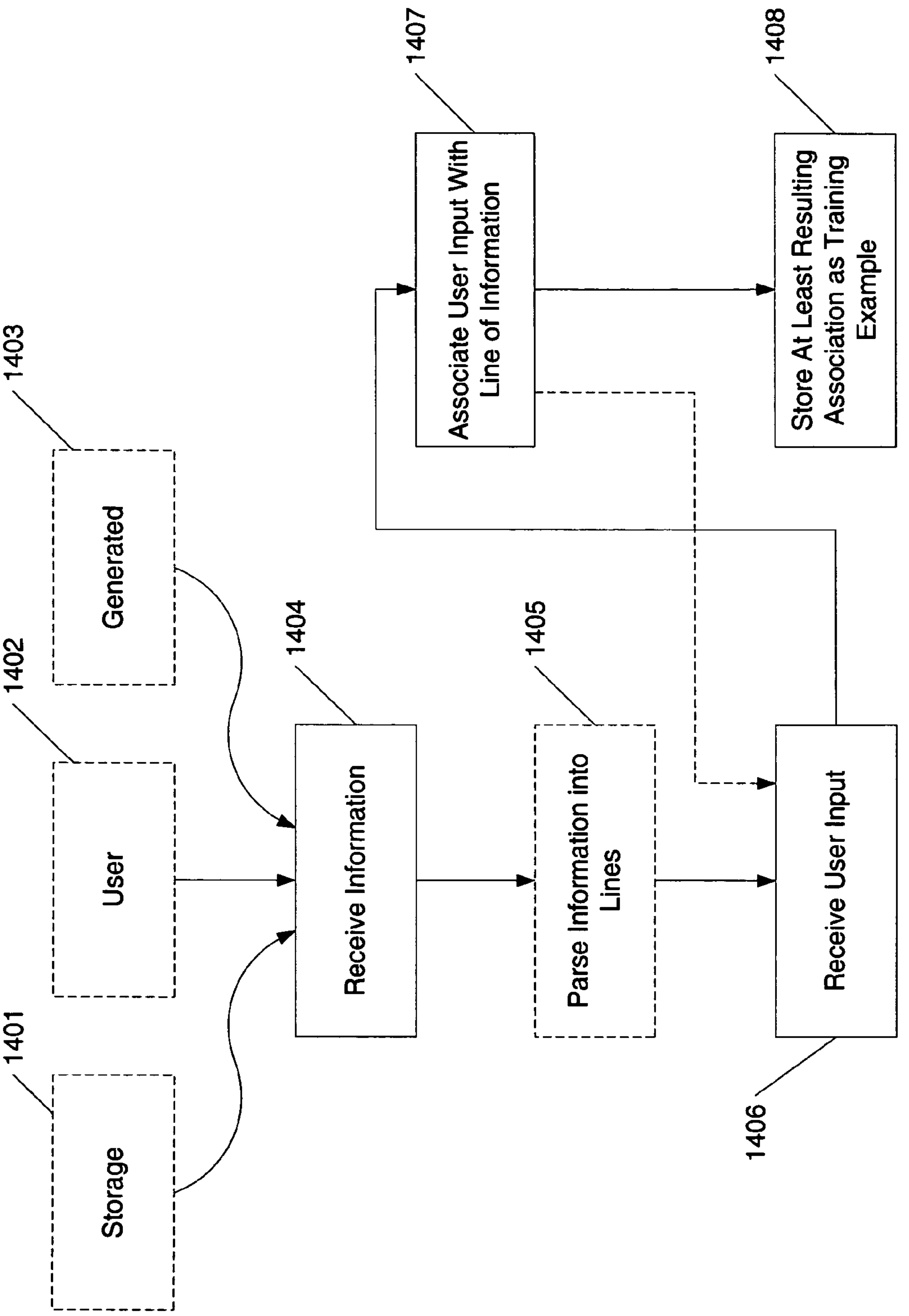
FIG. 14 shows an illustrative process for creating training examples in accordance with aspects of the present invention.

FIGS. 13 and 14 relate to the creation of training examples. FIG. 13 shows an illustrative user interface that may be used to create training examples, where the training examples may help adjust the model parameters of the algorithms described above.

Referring to FIG. 13, a user may use an interface that allows one to add labels to presented information. The labels are intended to be akin to the result of an ideal parsing system. A user interface is shown as display 1301. Display 1301 displays information 1302. Here, information 1302 is handwritten ink. The parsing system parses the various lines of information and allows a user to add labels for the lines. For instance, the first line of information 1303 has been selected. The selection may or may not be highlighted or otherwise visually modified to indicate a user''s selection. Here, the first line of information 1303 is surrounded by a bounding box and the ink emphasized. A user then enters a hierarchical label 1304. To assist the user, a region 1317 may or may not be displayed juxtaposed to a line of information. The region 1317 may provide a visual indication to a user that the user's input of hierarchical information will be associated with a currently selected line. A user may then move to other lines of information (using a mouse, pen, keyboard, trackball or other input device) and input additional hierarchical labels (for instance, labels 1305-1307. In addition to the hardware input devices, the user may use software-generated arrow keys 1308 or other software navigation techniques to navigate the lines of the received information 1302.

FIG. 13 reflects an outline mode 1309 of information 1302. Other modes may include a labeling mode 1310, a bullet mode 1311, and/or a reading order and direction mode 1312. FIG. 13 further shows how a system may or may not highlight lines of information. For instance, the first line has been highlighted with a bounding box 1313. Other bounding boxes (1314-1316) may be associated with other lines.

FIG. 14 shows an illustrative process for adding labels to received information to create training examples, where the training examples may then be used to adjust model parameters of labeling algorithms. In step 1404, information is received. The information may be ink, drawings, or graphical information (non-ASCII) information. The information may come from a storage 1401 (local or remote), directly from a user 1402, or as generated by a computer 1403 (for example, a system may generate random information so as to allow a user to parse the generated information into a hierarchical form).

In step 1405, the parsing system parses the received information into lines. Step 1405 is shown with a broken box to highlight the fact that the parsing of information into lines may occur before or after receiving step 1404. For instance, the information received in step 1404 may have been previously parsed and stored in storage 1401, may have been previously parsed by the user entering information in step 1402, or may be generated as separate lines in step 1403.

In step 1406, the process receives a user's input, where the input is the label designates the hierarchical level of the line of the received information. In step 1407, the process associates the assigned label with the respective line of information. Next, in step 1408, the process stores at least the resulting association as at least part of a training example. Step 1408 may follow each association in step 1407 or may follow a number of associations of step 1407. In some embodiments, the process may return to step 1406 after the completion of step 1407 until each line in the received information has been labeled. One will readily appreciate that groups of associations may be stored in batches as compared to individually stored.

The training example created in step 1408 (or collection of training examples created from step 1408) may then be used to train an algorithm to more correctly label hierarchical information.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer system for displaying a user interface, comprising:

a storage medium; and a display, wherein the computer system is enabled to parse information received by the computer system into component portions of the received information, determine raw features of the component portions, and visually render on the display a user interface comprising:

a first region displaying at least one of the component portions of the parsed information; and a second region enabled to receive user input designating a hierarchical level of at least one of the displayed component portions of the parsed information with respect to other component portions based on the determined raw features, wherein the computer system stores an association between said user input and the at least one of the component portions of the parsed information, wherein said association is used to train model parameters of an algorithm for automatically determining the hierarchical levels of component portions of parsed information from said raw features, wherein the computer system is further enabled to store multiple associations linking user input to multiple component portions of the parsed information, respectively, and train model parameters of an algorithm for determining the hierarchical levels of component portions of parsed information, using said multiple associations.

2. The computer system according to claim 1, wherein said received information is non-textual information.

3. The computer system according to claim 1, wherein said received information includes electronic ink.

4. The computer system according to claim 1, wherein said computer system has parsed said received information.

5. The computer system according to claim 1, wherein said computer system has received said information having been previously parsed.

6. The computer system according to claim 1, wherein said algorithm comprises a conditional random field algorithm.

7. The computer system according to claim 6, wherein said conditional random field algorithm comprises a Collins model algorithm.

8. The computer system according to claim 1, further comprising:

a third region, upon whose interaction with, navigates among said information having been parsed.

9. The computer system according to claim 1, further comprising:

a third region, upon whose interaction with, provides at least one alternate view in said first region of said information having been parsed.

10. A process for associating user input with parsed information comprising:

receiving parsed information;

determining raw features of at least one of component portions of the received parsed information;

receiving user input designating a hierarchical level of said at least one of component portions of the received parsed information with respect to other component portions based on the determined raw features;

associating said user input with the at least one of component portions of said received parsed information;

storing at least said association in a storage medium;

training model parameters of an algorithm for automatically determining the hierarchical levels of component portions of parsed information from said raw features, using said association; and wherein said storing and training steps further comprise:

storing multiple associations linking user input to multiple component portions of the parsed information, respectively; and training model parameters of an algorithm for determining the hierarchical levels of component portions of parsed information, using said multiple associations.

11. The process according to claim 10, wherein said algorithm comprises a conditional random field algorithm.

12. The process according to claim 11, wherein said conditional random field algorithm comprises a Collins model algorithm.

13. The process according to claim 10, wherein said step of receiving information receives information from a storage.

14. The process according to claim 10, wherein said step of receiving information receives information from a user.

15. The process according to claim 10, wherein said step of receiving information receives information having been generated by a computer.

16. The process according to claim 10, further comprising the step of:

parsing said received information into lines.

17. The process according to claim 10, wherein said step of receiving information receives information having been previously parsed into lines.

18. A computer-readable storage medium having a program stored thereon for associating user input with parsed information, said program when executed enables a computer to perform:

receiving parsed information;

determining raw features of at least one of component portions of the received parsed information;

receiving user input designating a hierarchical level of said at least one of component portions of the received parsed information with respect to other component portions based on the determined raw features;

associating said user input with the at least one of the component portions of said received parsed information;

storing at least said association in a storage medium;

training model parameters of an algorithm for automatically determining the hierarchical levels of component portions of parsed information from said raw features, using said association; and wherein said storing and training steps further comprise:

storing multiple associations linking user input to multiple component portions of the parsed information, respectively; and training model parameters of an algorithm for determining the hierarchical levels of component portions of parsed information, using said multiple associations.

19. The computer-readable medium according to claim 18, wherein said algorithm comprises a conditional random field algorithm.

20. The computer-readable medium according to claim 19, wherein said conditional random field algorithm includes a Collins model algorithm.

21. The computer-readable medium according to claim 18, wherein said step of receiving information receives information from a storage.

22. The computer-readable medium according to claim 18, wherein said step of receiving information receives information from a user.

23. The computer-readable medium according to claim 18, wherein said step of receiving information receives information having been generated by a computer.

24. The computer-readable medium according to claim 18, said program further comprising the step of:

parsing said received information into lines.

25. The computer-readable medium according to claim 18, wherein said receiving step receives information having been previously parsed into lines.

26. A computer for associating user input with parsed information comprising:

means for receiving parsed information;

means for determining raw features of at least one of component portions of the received parsed information;

means for receiving user input designating a hierarchical level of said at least a component portion of said parsed information with respect to other component portions based on the determined raw features;

means for associating said user input with the at least one of the component portions of said received parsed information;

means for storing at least said association in a storage medium; and means for training model parameters of an algorithm for automatically determining the hierarchical levels of component portions of parsed information from said raw features, using said association; and wherein said means for storing and means for training further comprise:

means for storing multiple associations linking user input to multiple component portions of the parsed information, respectively; and means for training model parameters of an algorithm for determining the hierarchical levels of component portions of parsed information, using said multiple associations.

27. The computer according to claim 26, wherein said algorithm is a conditional random field algorithm.

28. The computer according to claim 27, wherein said conditional random field algorithm includes a Collins model algorithm.

29. The computer according to claim 26, wherein said means for receiving receives information from a storage.

30. The computer according to claim 26, wherein said means for receiving receives information from a user.

31. The computer according to claim 26, wherein said means for receiving receives information having been generated by a computer.

32. The computer according to claim 26, further comprising:

means for parsing said received information into lines.

33. The computer according to claim 26, wherein said means for receiving receives information having been previously parsed into lines.

34. A method for training a program for automatic determination of a hierarchical structure of parsed information, comprising the steps of:

(a) receiving parsed information;

(b) determining raw features of a particular portion of the received parsed information;(c) inputting from a user information regarding a hierarchical level of the particular portion of the parsed information with respect to other portions of the parsed information based on the determined raw features;

(d) associating said user input with said portion of the parsed information;

(e) storing said association in a memory;

(f) training said program to automatically determine hierarchical levels of portions of parsed information from said raw features based on said stored association; and wherein steps (b) through (d) are repeated for a plurality of portions of the parsed information, and wherein step (e) comprises training said program to automatically determine hierarchical levels of portions of parsed information based on the plurality of stored associations.

35. The method according to claim 34, wherein said parsed information is displayed in a user interface rendered on a display, and further wherein the user inputs said information regarding a hierarchical level of a particular portion of the parsed information using the user interface rendered on a display.

36. The method according to claim 34, wherein said portions of the parsed information comprise lines of the parsed information.

37. The method according to claim 34, wherein the parsed information comprises non-character based information.

* * * * *